(12) United States Patent
Field

(10) Patent No.: US 6,867,793 B2
(45) Date of Patent: Mar. 15, 2005

(54) METHOD AND MATERIALS FOR ENTITLING COMPACT DISCS

(75) Inventor: Marshall Field, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 70 days.

(21) Appl. No.: 10/160,825

(22) Filed: May 31, 2002

(65) Prior Publication Data

US 2003/0222965 A1 Dec. 4, 2003

(51) Int. Cl.[7] ................................................. B41J 2/47
(52) U.S. Cl. ........................................................ 347/225
(58) Field of Search ................................ 347/225, 241, 347/264, 262, 171, 191, 181, 194, 204, 233, 237, 238, 240, 247, 251; 346/111, 115, 121, 130, 131, 49, 52, 55, 135.1, 62, 76.1, 107.6

(56) References Cited

U.S. PATENT DOCUMENTS

| 4,961,077 A | 10/1990 | Wilson et al. |
|---|---|---|
| 5,306,349 A | 4/1994 | Nee |
| 5,317,337 A | 5/1994 | Ewaldt |
| 5,520,865 A | 5/1996 | Sargent, III et al. |
| 5,706,047 A * | 1/1998 | Lentz et al. ................ 347/262 |
| 5,741,836 A | 4/1998 | Krenceski et al. |
| 6,084,603 A | 7/2000 | Arai et al. |
| 6,121,130 A | 9/2000 | Chua et al. |
| 6,258,509 B1 | 7/2001 | Usami et al. |
| 6,264,295 B1 | 7/2001 | Bradshaw et al. |
| 6,273,167 B1 | 8/2001 | Miller |
| 6,295,262 B1 | 9/2001 | Kusumoto et al. |
| 6,632,890 B1 * | 10/2003 | Bates et al. |

FOREIGN PATENT DOCUMENTS

| EP | 115441882 | 11/2001 |
|---|---|---|
| EP | 0308938 A2 | 5/2003 |
| WO | WO 99/65696 | 12/1999 |

* cited by examiner

Primary Examiner—Raquel Yvette Gordon

(57) ABSTRACT

A method of marking an optical recording medium is provided. The method includes providing a curable material on a non-data surface of the optical recording medium. An energy source interacts with the curable material to form permanent text and/or images on the optical recording medium. The energy source includes a laser that produces energy at a frequency absorbed by the curable material. The method does not require specialized equipment and allows for increased amounts of information to be marked on the optical recording medium.

21 Claims, 3 Drawing Sheets

METHOD AND MATERIALS FOR ENTITLING COMPACT DISCS

FIELD OF THE INVENTION

The present invention generally relates to methods of permanently titling or marking optical recording media. More specifically, the present invention relates to methods of permanently marking optical recording media using an energy source.

BACKGROUND OF THE INVENTION

Optical recording media known in the art include compact discs ("CDs"), recordable CDs ("CD-R"), rewritable CDs ("CD-RW"), write-only CDs ("CD-WO"), and digital video discs ("DVDs"). An optical recording medium is typically comprised of multiple layers that are compressed and adhered together. The bottom layer is a transparent substrate or support layer. Overlying the bottom layer, in ascending order, are a recording layer, a light reflective layer, and a protective layer. The optical recording medium is comprised of two surfaces, a data surface and a non-data surface. The data surface contains the information recorded onto the optical recording medium. The information is read by exposing the data surface to a laser. The non-data surface generally includes the protective layer and any images printed onto that layer.

The most common method of identifying the contents of the optical recording medium is to mark the case in which it is stored. This is typically accomplished by including printed material in the case. However, if the optical recording medium is ever separated from its case, the contents of the optical recording medium can not be easily identified.

The non-data surface of the optical recording medium may also be marked so that the contents of the optical recording medium may be easily identified. For example, images, such as text or graphics, may be printed on the protective layer by a variety of techniques. The least expensive method of marking the optical recording medium is to manually mark on the medium with a writing instrument. However, this method presents a number of problems. First, the method is not permanent because the writing may smear or fade over time. In addition, the amount of information that can be marked on the medium is limited by the nib size of the pen and the user's handwriting. Furthermore, the ink of the writing instrument may damage the underlying layers of the medium or interfere with the reading of the data surface. Finally, the writing instrument itself may damage the protective layer if it has a hard tip.

Another inexpensive method of marking is to apply labels marked with identifying images to the optical recording medium. However this method is disadvantageous because the amount of information that may be stored on the label is limited by the nib size of the writing instrument, the user's handwriting, and the size of the label. In addition, if the labels are not perfectly centered, they may affect the rotation of the optical recording medium, thereby causing read errors. Labels known in the art include symmetrical, doughnut-shaped labels and asymmetrical labels. Furthermore, if the label is ever removed, the adhesive may remove and damage portions of the underlying layers, causing additional problems with rotation of the optical recording medium or reading of the same.

More expensive methods of marking optical recording medium include printing images on the protective layer. The images may be printed by screen-printing, ink-jet printing, or wax transfer printing. These printing techniques require expensive printers and, typically, are only economical when commercial quantities of the optical recording medium need to be marked with identical information. The most common method of marking optical recording medium is screen-printing. Screen-printing utilizes an ultra-violet ("UV")-curable ink or coating that is applied over the protective layer. Typical UV-curable coatings comprise resins that can be polymerized (such as acrylates), pigments, and photoinitiators. The UV-curable coatings may also contain additional resins to modify the viscosity, adhesion, and gloss properties of the coatings. UV-curable coatings are known in the art and are commercially available from Coates Bros. PLC (Kent, Great Britain) or Coates Inc. (USA). The UV-curable coating is applied over the protective layer and must bond thereto. The UV-curable coating is cured by exposure to a UV-light source, which initiates polymerization of the acrylates, causing them to form a hard, non-smearable coating on the optical recording medium. UV-curable coatings are available in various colors, so that multi-color text or graphics may be marked on the optical recording medium.

While multiple methods of marking optical recording medium exist, the methods vary in the permanence of the marks, the specialized equipment that is required, and the amount of information that can be marked. In view of the shortcomings in the art, there is a need for a method of permanently marking optical recording medium that does not require specialized equipment and that allows increased amounts of information to be marked.

BRIEF SUMMARY OF THE INVENTION

In accordance with the present invention, a method of marking optical recording medium is disclosed. This method provides permanent markings on an optical recording medium with increased amounts of information, without affecting the readability or rotatability of the optical recording medium or requiring specialized equipment.

In one embodiment, the method comprises providing a curable material on a non-data surface of the optical recording medium. Permanent marks are formed on the optical recording medium using an energy source, such as a laser. The energy source interacts with the curable material to form the permanent marks by densifying the curable material or, alternatively, by ablating the curable material.

In another embodiment, a method of permanently marking an optical recording medium using a read-laser from a CD reader/writer is provided. The method comprises providing a curable material on a non-data surface of the optical recording medium. Permanent marks are formed on the optical recording medium using the read-laser from a CD reader/writer. Since the read-laser is an integral component of the CD reader/writer, this provides a method of marking that does not require specialized equipment.

BRIEF DESCRIPTION OF THE SEVERAL VIEWS OF THE DRAWING

The patent or application file contains at least one drawing executed in color. Copies of this patent or patent application publication with color drawing(s) will be provided by the U.S. Patent and Trademark Office upon request and payment of the necessary fee.

While the specification concludes with claims particularly pointing out and distinctly claiming that which is regarded as the present invention, the present invention can be more readily ascertained from the following description of the invention when read in conjunction with the accompanying drawings in which:

DETAILED DESCRIPTION OF THE INVENTION

Figure 1:
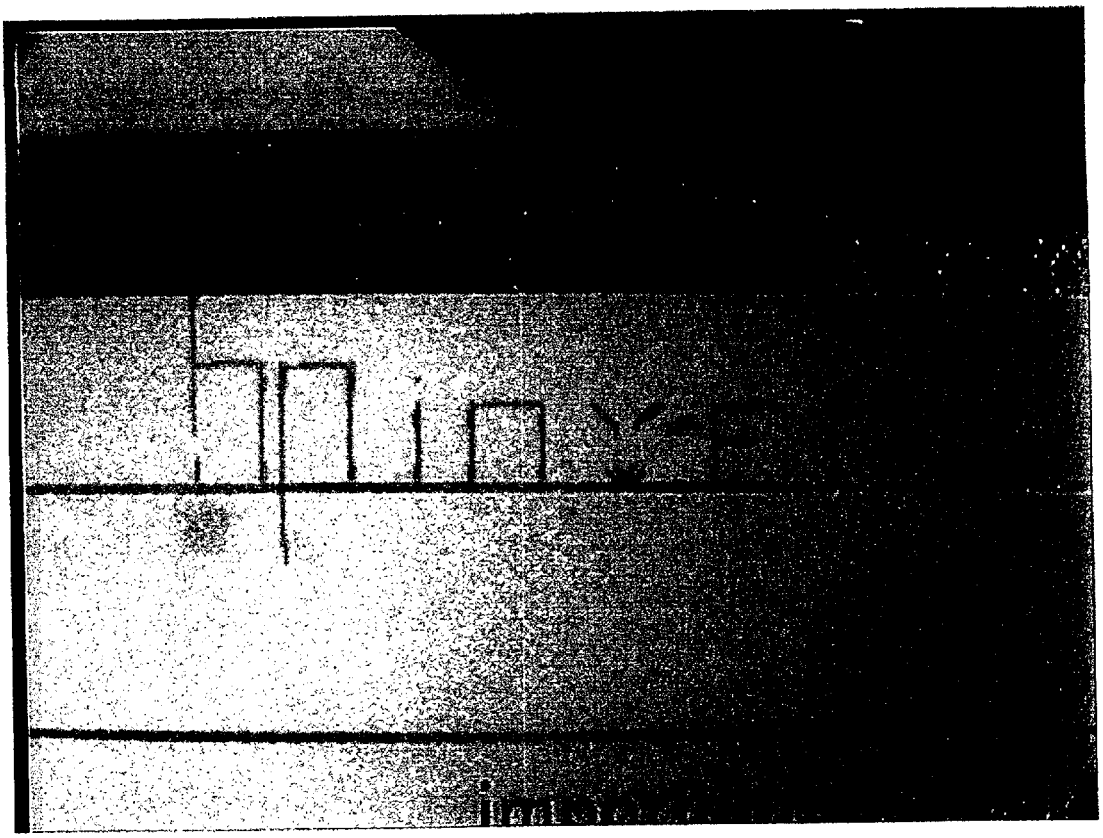
FIGS. 1–3 show optical recording media marked by the method of the present invention.

The present invention is directed to a method of marking or titling optical recording medium. More specifically, a method of permanently marking or titling optical recording medium that does not require specialized equipment and allows for increased amounts of information to be marked is provided.

The method comprises providing a curable coating or material on a non-data surface of an optical recording medium. As used herein, the term "curable material" means a cured material or coating that may be further cured upon exposure to an energy source, such as a laser. An energy source interacts with the curable material to form permanent marks on the optical recording medium. Optical recording media of the present invention include compact discs ("CDs"), recordable CDs ("CD-R"), rewritable CDs ("CD-RW"), digital video discs ("DVDs"), or any other optical recording medium known in the art. It is further understood that the optical recording medium may include a substrate or surface that is coated with the curable material. For example, the substrate may include a substrate of any shape that is coated with the curable material, such as a CD-shaped, plastic substrate.

In a particular embodiment, the curable material may comprise a cured coating that is further curable upon exposure to an energy source. For example, the curable material may comprise a UV-cured coating, which is well known in the art. The UV-cured coating is relatively porous and has a low density, making it curable upon exposure to the energy source. Optical recording medium comprising UV-cured coatings are commercially available from various sources, such as Imation Corp. (Oakdale, Minn.), Sony Corp. (Tokyo, Japan), and TDK Corp. (Tokyo, Japan). In the present invention, the UV-cured coating must absorb energy at the frequency emitted by the energy source.

Other curable materials may also be applied to the non-data surface of the optical recording medium as long as they absorb energy at the frequency emitted by the energy source. These curable materials may include, but are not limited to, thermochromic coatings and ink-receptive coatings. Thermochromic coatings change color when exposed to an energy source, such as heat. Ink-receptive coatings allow the user to write directly on the optical recording medium with a marker or other writing instrument. These curable materials may be applied over, or instead of, the UV-cured coatings. The curable material may be a secondary coating applied to make the uppermost layer of the optical recording medium ink-receptive or writable by including a sensitizer or other such component known in the art. This secondary coating may be applied by the manufacturer or user.

The non-data surface of the optical recording medium may be completely or partially coated with the curable material. In addition, the non-data surface may be coated with more than one curable material. For example, a thermochromic coating may be applied to one portion of the non-data surface while a UV-cured coating may be applied to the remaining portion of the non-data surface.

The curable material may be applied directly to the optical recording medium or to pressure-sensitive labels that may be applied or adhered to the optical recording medium. For example, labels comprising a coating of pigmented plastisols are known in the art and may be marked according to the present invention. Preferably, the coated labels are symmetrically shaped so that they do not adversely affect the rotation of the optical recording medium. However, the labels may be asymmetric if they do not substantially affect the optical recording medium's ability to rotate. These coated labels may be applied to the optical recording medium and then marked according to the present invention. Conversely, the coated labels may be marked according to the present invention and then applied to the optical recording medium.

Figure 2:
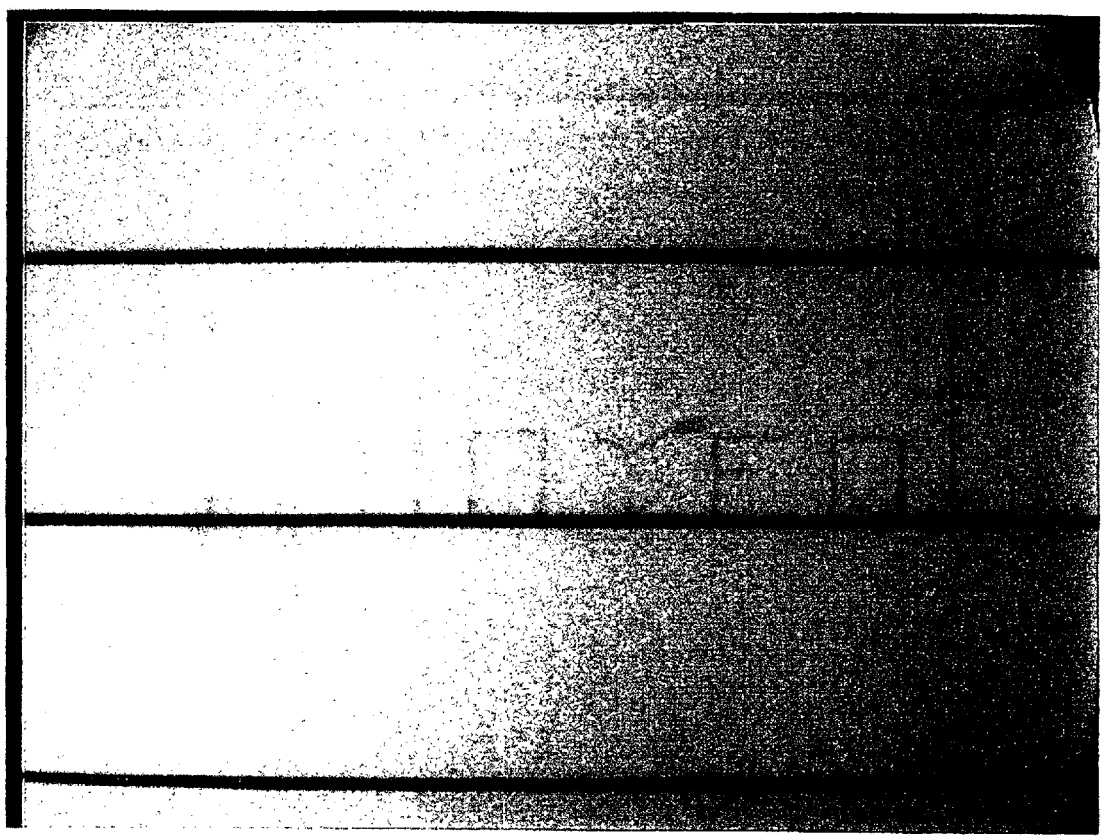
Figure 3:
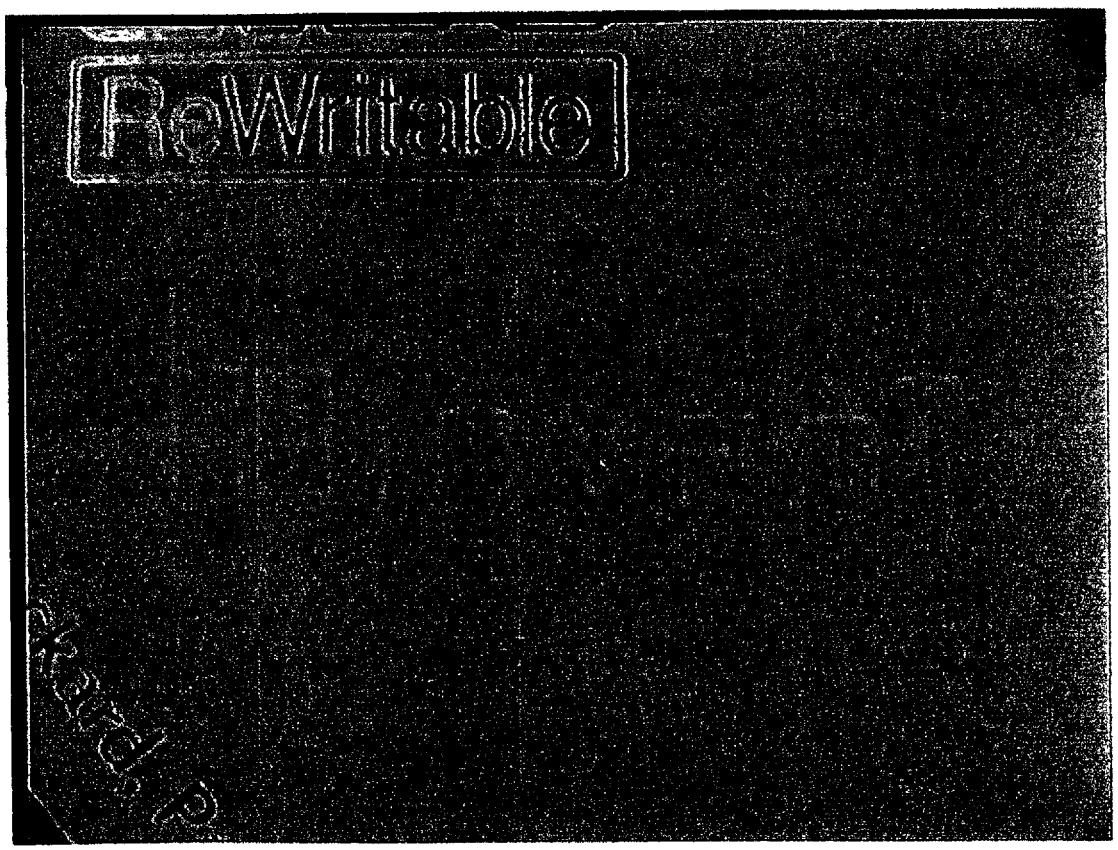

In one embodiment of the present invention, the curable material is marked using a heat-producing energy source. Without being bound by any particular theory regarding mode of action, it is believed that the heat from the energy source interacts with the curable material to form permanent marks on the optical recording medium. When the curable material is a UV-cured coating, it is believed that the heat from the energy source densifies or condenses portions of the curable material that were exposed to the energy source. Densifying the curable material changes its light reflectivity, which results in a visual contrast between the exposed and non-exposed portions of the curable material. As shown in FIGS. 1–3, the contrast between the exposed and non-exposed portions is visible to the human eye and is visible as a light mark against a dark background or a dark mark against a light background. However, it is further understood that the contrast between the exposed and non-exposed portions may be visible as a colored mark against a darker or lighter background. In addition, the heat from the energy source may oxidize the curable material, causing its color or surface finish to change.

When the curable material is a different type of coating, such as a pigmented plastisol, the heat from the energy source may ablate or vaporize the curable material. This allows the label stock to be visible through the portions of the curable material that were ablated. In addition, the energy source may melt the curable material, allowing the label stock to be visible through the melted portions of the curable material. Depending on the color of the label stock and the color of the uppermost layer of the optical recording medium, the resulting, permanent mark may appear as a light mark against a dark background or a dark mark against a light background.

The energy source comprises a narrowly-focused beam of energy or heat. One energy source that may be used in the present invention is a laser. A laser of any frequency or wavelength may be used as long as the curable material absorbs a wavelength of that particular frequency. The laser must provide enough energy within a particular area to mark the curable material. However, if the laser provides too much energy in too small an area, the curable material may become a powder. If the laser does not provide enough energy or provides the energy in too large of an area, the mark in the curable material may not be visible. While the laser is one energy source that may be used in the present invention, other energy sources, such as ion or electron beams, may also be used so long as the energy source may be narrowly-focused and provides sufficient energy to densify, ablate, or vaporize the curable material.

The method of the present invention allows for individualized information to be permanently marked on the curable material. The information may be chosen or defined by the user and may include text, graphics, or a combination thereof. Exemplary types of information include, but are not limited to, song playlists, identifying marks indicating ownership, piracy features, and personalized messages. Since use of a laser provides a narrowly-focused beam of energy, small portions of the curable material may be cured by exposure to the laser. This allows smaller text or graphics to be marked on the optical recording medium than was previously possible. Therefore, larger amounts of information may be marked on the optical recording medium than were previously possible. In addition, small marks that are not visible to the unaided human eye may be made on the curable material. These small marks may operate as security codes to prevent piracy or to verify ownership. However, it is also contemplated that the curable material may be marked with large graphics, colors, and/or images.

In another embodiment, the curable material of the optical recording medium is permanently marked using a read-laser from a CD reader/writer. CD reader/writers are known in the art and typically include a 780 nm read-laser to read or write the information on the optical recording medium. In one particular embodiment, the optical recording medium is inverted so that its non-data surface is exposed to the read-laser. Since the read-laser may be completely controlled by the data-read/write software of the CD reader/writer, the read-laser may be programmed to interact with the curable material. For example, the software may be programmed with a formatted data stream that includes the text or graphics to be marked. The software also directs the read-laser to the appropriate position(s) on the optical recording medium for proper placement of the text or graphics. Then, the read-laser is modulated to write the information onto the curable material while the optical recording medium is spinning. This process of writing information to the curable material on the optical recording medium is similar to streaming data to an ink jet printer. Since the CD reader/writer includes a 780 nm read-laser, this method of marking the optical recording medium can be accomplished without purchasing specialized equipment.

The lasers found in readers or writers of other optical recording medium may be used in the present invention so long as these lasers emit a frequency of energy that may be absorbed by the curable material. As understood by one of ordinary skill in the art, the data-read/write software for these readers or writers of other optical recording medium may be programmed so that the read-laser interacts with the curable material.

The invention is further explained by the use of the following illustrative examples:

EXAMPLES

Example I

Marking of the CD

A CD was inverted so that its UV-cured coating, which was applied to the non-data side of the CD by the manufacturer, was exposed to the laser. The laser was a doubled YAG laser with a frequency of 531 nm. The CD was mounted on a programmable, motor-driven x-y stage to move the CD relative to the laser. The laser was modulated (i.e., turned on and off) so that portions of the UV-cured coating were exposed to the laser. The exposed portions of the UV-cured coating were densified, resulting in a difference between the light reflectivities of the exposed and the non-exposed portions of the UV-cured coating. These densified portions of the UV-cured coating are illustrated in FIGS. 1–3 as the mark "hpinvent" on the non-data surface of the optical recording medium. FIG. 1 shows the mark on an optical recording medium with a turquoise UV-cured coating. FIG. 2 shows the same mark on an optical recording medium coated with a metallic silver UV-cured coating. FIG. 3 shows the same mark on an optical recording medium coated with a magenta UV-cured coating.

In a separate experiment, the 531 nm laser was replaced with a 780 nm laser diode and the above procedure was followed to produce marked CDs according to the present invention.

Example II

Marking of the CD-R

A CD-R is marked according to the process described in Example I. The CD-R is inverted so that its curable material, which is applied to the non-data side of the CD-R by the manufacturer or user, is exposed to the laser. The frequency of the laser is chosen such that the curable material absorbs that frequency. The CD-R is mounted on a programmable, motor-driven x-y stage to move the CD-R relative to the laser. The laser is modulated so that portions of the curable material are exposed to the laser. The exposed portions of the curable material are densified, resulting in a difference in the light reflectivities between the exposed and the non-exposed portions of the curable material. Visible, permanent marks are produced on the CD-R as a result of the densified portions.

Example III

Marking of the CD-RW

A CD-RW is marked according to the process described in Example I. The CD-RW is inverted so that its curable material, which is applied to the non-data side of the CD-RW by the manufacturer or user, is exposed to the laser. The frequency of the laser is chosen such that the curable material absorbs that frequency. The CD-RW is mounted on a programmable, motor-driven x-y stage to move the CD-RW relative to the laser. The laser is modulated so that portions of the curable material are exposed to the laser. The exposed portions of the curable material are densified, resulting in a difference in the light reflectivities between the exposed and the non-exposed portions of the curable material. Visible, permanent marks are produced on the CD-RW as a result of the densified portions.

Example IV

Marking of the DVD

A DVD is marked according to the process described in Example I. The DVD is inverted so that its curable material, which is applied to the non-data side of the DVD by the manufacturer or user, is exposed to the laser. The frequency of the laser is chosen such that the curable material absorbs that frequency. The DVD is mounted on a programmable, motor-driven x-y stage to move the DVD relative to the laser. The laser is modulated so that portions of the curable material are exposed to the laser. The exposed portions of the curable material are densified, resulting in a difference in the light reflectivities between the exposed and the non-exposed portions of the curable material. Visible, permanent marks are produced on the DVD as a result of the densified portions.

Example V

Marking of Coated, Pressure-Sensitive Labels to be Applied to the CD

Pressure-sensitive labels produced and coated by Brady Corp. (Milwaukee, Wis.) were marked as described in Example I, except that the curable material comprised a coating of pigmented plastisols applied to the pressure-sensitive labels. The coated labels were adhered to the non-data surface of the CD. The CD was inverted so that the coated labels were exposed to the laser. The heat from the laser ablated or melted the pigmented plastisol coating from the exposed portions. The underlying label stock was visible through the exposed portions, thereby making permanent marks on the CD.

Example VI

Marking of Coated, Pressure-Sensitive Labels to be Applied to the CD-R

Pressure-sensitive labels are marked according to the process described in Example V. The coated labels are adhered to the non-data surface of the CD-R. The CD-R is inverted so that the coated labels are exposed to the laser. The heat from the laser ablates or melts the pigmented plastisol coating from the exposed portions. The underlying label stock is visible through the exposed portions, thereby making permanent marks on the CD-R.

Example VII

Marking of Coated, Pressure-Sensitive Labels to be Applied to the CD-RW

Pressure-sensitive labels are marked according to the process described in Example V. The coated labels are adhered to the non-data surface of the CD-RW. The CD-RW is inverted so that the coated labels are exposed to the laser. The heat from the laser ablates or melts the pigmented plastisol coating from the exposed portions. The underlying label stock is visible through the exposed portions, thereby making permanent marks on the CD-RW.

Example VIII

Marking of Coated, Pressure-Sensitive Labels to be Applied to the DVD

Pressure-sensitive labels are marked according to the process described in Example V. The coated labels are adhered to the non-data surface of the DVD. The DVD is inverted so that the coated labels are exposed to the laser. The heat from the laser ablates or melts the pigmented plastisol coating from the exposed portions. The underlying label stock is visible through the exposed portions, thereby making permanent marks on the DVD.

Example IX

Marking of the CD Using the CD Reader/Writer

A read-laser in the CD reader/writer was used to mark the CD. The CD comprised the UV-cured coating and was inverted in the CD reader/writer so that its UV-cured coating was exposed to the read-laser. The read-laser was programmed to refocus and spinning of the CD was initiated. Since the read-laser is typically configured to focus 1.2 mm under the data-surface in order to read the optical information recorded on the recording layer of the CD, the read-laser must be refocused to adjust the depth within which the read-laser marks the non-data surface of the CD. The read-laser was then directed to the center of the CD. The formatted data stream, which included the information to be marked on the CD and the position it should be marked, was rasterized to write on the spiral path produced by the spinning CD. The resulting CD was permanently marked with the information included in the formatted data stream.

Example X

Marking of the CD-R Using the Optical Recording Medium Reader/Writer

A read-laser in the reader/writer of the optical recording medium is used to mark the CD-R according to the process described in Example IX. The non-data surface of the CD-R curable material is provided and the CD-R is then inverted in the optical recording medium reader/writer so that the curable material is exposed to the read-laser. The read-laser is programmed to refocus and spinning of the CD-R is initiated. The read-laser is then directed to the center of the CD-R. The formatted data stream, including the information to be marked on the CD-R and the position it should be marked, is rasterized to write on the spiral path produced by the spinning CD-R. The resulting CD-R is permanently marked with the information included in the formatted data stream.

Example XI

Marking of the CD-RW Using the Optical Recording Medium Reader/Writer

A read-laser in the reader/writer of the optical recording medium is used to mark the CD-RW according to the process described in Example IX. The non-data surface of the CD-RW curable material is provided and the CD-RW is then inverted in the optical recording medium reader/writer so that the curable material is exposed to the read-laser. The read-laser is programmed to refocus and spinning of the CD-RW is initiated. The read-laser is then directed to the center of the CD-RW. The formatted data stream, including the information to be marked on the CD-RW and the position it should be marked, is rasterized to write on the spiral path produced by the spinning CD-RW. The resulting CD-RW is permanently marked with the information included in the formatted data stream.

Example XII

Marking of the DVD Using the Optical Recording Medium Reader/Writer

A read-laser in the reader/writer of the optical recording medium is used to mark the DVD according to the process described in Example IX. The non-data surface of the DVD curable material is provided and the DVD is then inverted in the optical recording medium reader/writer so that the curable material is exposed to the read-laser. The read-laser is programmed to refocus and spinning of the DVD is initiated. The read-laser is then directed to the center of the DVD. The formatted data stream, including the information to be marked on the optical recording medium and the position it should be marked, is rasterized to write on the spiral path produced by the spinning DVD. The resulting DVD is permanently marked with the information included in the formatted data stream.

What is claimed is:

1. A method of marking an optical recording medium, comprising:
   providing a cured coating on a non-data surface of an optical recording medium, wherein the cured coating is further curable upon exposure to an energy source; and
   forming permanent marks on the cured coating by interacting the energy source with the cured coating.

2. The method of claim 1, wherein forming permanent marks on the cured coating by interacting the energy source with the cured coating comprises forming permanent marks on the cured coating by interacting a laser with the cured coating.

3. The method of claim 1, wherein the cured coating absorbs a frequency of energy emitted by the energy source.

4. The method of claim 1, wherein the cured coating is further cured by heat.

5. The method of claim 1, wherein the cured coating is an ultra-violet cured coating.

6. The method of claim 1, wherein forming permanent marks on the cured coating by interacting the energy source with the cured coating comprises densifying portions of the cured coating exposed to the energy source.

7. The method of claim 1, wherein forming permanent marks on the cured coating by interacting the energy source with the cured coating comprises forming permanent marks by ablating portions of the cured coating exposed to the energy source.

8. The method of claim 1, wherein the optical recording medium is selected from the group consisting of a compact disc, a recordable compact disc, a rewritable compact disc, a write-only compact disc, and a digital video disc.

9. The method of claim 1, further comprising applying the cured coating to a pressure sensitive label and applying the pressure sensitive label to the non-data surface of the optical recording medium.

10. A method of marking an optical recording medium comprising:
   providing a cured coating on a non-data surface of an optical recording medium, wherein the cured coating is further curable upon exposure to an energy source; and
   forming permanent marks on the cured coating by interacting a read-laser of an optical recording medium reader/writer with the cured coating.

11. The method of claim 10, wherein the cured coating is further cured by heat.

12. The method of claim 10, wherein the cured coating absorbs a frequency emitted by the read-laser.

13. The method of claim 10, wherein forming permanent marks on the cured coating by interacting a read-laser with the cured coating comprises densifying portions of the cured coating exposed to the read-laser.

14. The method of claim 10, wherein forming permanent marks on the cured coating by interacting a read-laser with the cured coating comprises forming permanent marks by ablating portions of the cured coating exposed to the read-laser.

15. The method of claim 10, further comprising programming the read-laser to mark the optical recording medium.

16. The method of claim 10, wherein the optical recording medium is selected from the group consisting of a compact disc, a recordable compact disc, a rewritable compact disc, a write-only compact disc, and a digital video disc.

17. The method of claim 10, wherein the cured coating is an ultra-violet cured coating.

18. An optical recording medium permanently marked on a non-data surface, the optical recording medium comprising a cured coating disposed on the non-data surface, wherein portions of the cured coating are densified or ablated to form permanent marks.

19. The optical recording medium of claim 18, wherein the cured coating absorbs a frequency of energy emitted by an energy source.

20. The optical recording medium of claim 18, wherein the cured coating is further cured by a laser.

21. The optical recording medium of claim 18, wherein the cured coating is an ultra-violet cured coating.

* * * * *